UNITED STATES PATENT OFFICE.

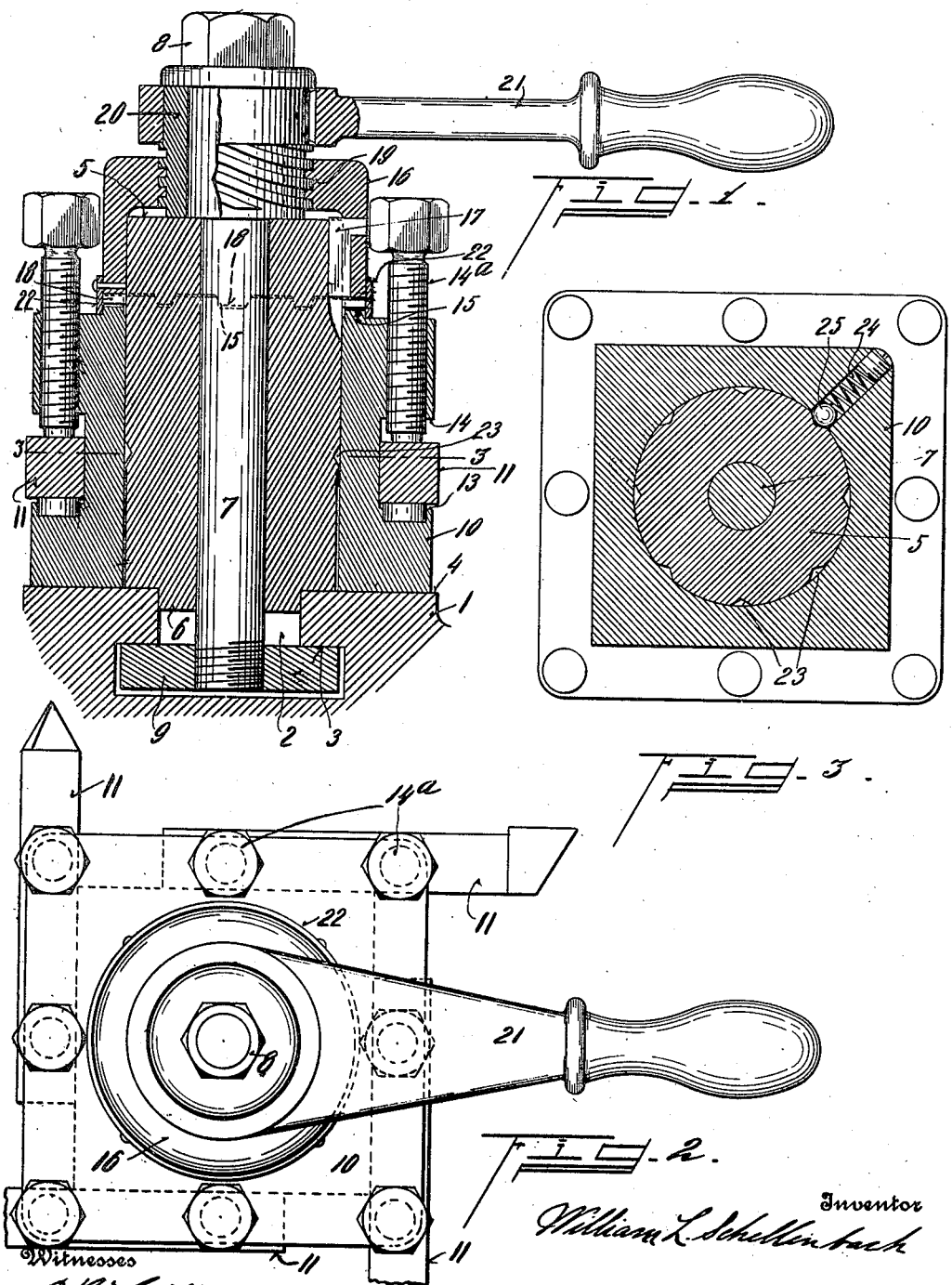

WILLIAM L. SCHELLENBACH, OF HARTWELL, OHIO.

MULTIPLE-TOOL HOLDER.

1,152,055.   Specification of Letters Patent.   Patented Aug. 31, 1915.

Application filed July 15, 1914.   Serial No. 851,220.

*To all whom it may concern:*

Be it known that I, WILLIAM L. SCHELLENBACH, a citizen of the United States, and residing at Hartwell, in the county of Hamilton and State of Ohio, have invented a new and useful Improvement in Multiple-Tool Holders, of which the following specification is a full disclosure.

My invention relates to a multiple tool-holder.

The object of the invention is to produce an adjustable multiple tool-holder for machine tools, which is simple in construction and efficient in operation and which can be easily adjusted and rigidly clamped to set position.

The features of the invention are more fully set forth in the description of the accompanying drawings, forming a part of this specification, in which:—

Figure 1 is a central vertical section. Fig. 2 is a top plan view. Fig. 3 is a section on line 3—3, Fig. 1.

The support 1 is provided with a T-slot 2, providing the exterior and interior clamping surfaces 3, 4, respectively. A centrally bored column 5, circumferential in cross section, is set on the support, having a bottom portion 6 of reduced diameter fitting down into the T-slot opening of the support. The column is rigidly clamped on the support by a central bolt 7, having the bolt head 8 on top of the tool-post, its lower end being screw threaded into the clamp-block 9 in the T-slot, an appropriate turn of the bolt clamping column against the abutment surfaces 3 of the support. Rotatably fitting the column is a multiple tool-holder 10 resting on the seat surface 4 of the support. Said holder is provided with the upper and lower ledges 13, 14, on the four sides providing tool-holder jaws for the tools 11, secured therein by clamping bolts 14ª. The upper surface of said tool-holder is formed with an annular projection having clutch teeth 15. A reciprocating annular clamp member 16 is placed over the upper end of the tool-holder, inclosing the upper end of the column and having the spline connection 17 therewith, enabling it to be moved vertically relative to the column but fixing it against rotation on the column. The lower end of member 16 is formed with clutch teeth 18 for coaction with the tool-holder clutch teeth 15. Said member 16 has an upper annular opening formed with the internal screw threads 19. The element 15 thus constitutes a non-rotatable column member, to be translated for clutching and clamping the tool holder to the column. Fitting into said annular opening is a rotary annular member 20 having screw threaded engagement with said threads 19, said member 20 seating concentrically on top of the column 5 and under the bolt-head 8, so as to turn on the bolt 7 as a center, it being provided with an operating handle 21, the annulus 20 thus constituting a rotatable actuator for translating the non-rotatable member 20 on the column.

Preferably the clutch tooth operating space between the meeting surfaces of the tool-holder and the reciprocating member 16 is protected by a ring 22 secured to member 16 and telescoping relative to the upper end of the tool-holder. Also preferably a medial portion of the column is formed with detents 23, coacting with a spring plunger in the tool-holder specifically as comprising a spring 24 with a ball 25 to automatically interlock with detents 23 in predetermined tool positions.

The column being clamped on the support as described, an appropriate turn of handle 21 rotates member 20, thereby vertically raising member 16 to disengage clutch teeth 15 and 18, rendering the tool-holder free to be rotatably adjusted by hand to a selective tool position. A reverse turn of handle 21 will then function to depress member 16, interlocking said clutch teeth and also rigidly clamping the tool-holder down upon the surface 4 of the support, and also clamping the tool-holder relative to the fixed column.

The member to be translated, 16, operated by the rotary member or annulus 20, thus clutches the tool holder and the effect of the screw coaction of said members is to securely clamp the tool holder relative to the support and relative to the column which is independently clamped on the support. Thus the tool-holder is very firmly secured in adjusted position and can be readily released for resetting the tools. As the annulus 20 is longitudinally confined between the top of the column and the under surface of the bolt-head (8) flange the vertical movement of member 16 effects both the clamping and clutching functions.

One of the advantages of my invention inhering from the structural principle, is, that the column with its tool support and clamping provision is readily removable from a specific support, and thereby constitutes a unit interchangeable relative to varying specific supports, all conventionally formed with T-slots, whereby the invention can be utilized with simple or compound seats, or forward or rearward slides on the various types of machine tools having requisition for multiple tool work.

It is advantageous to have the number of clutch positions for the tool holder constitute a multiple of the number of cutting tools mountable on the holder so that each tool may have two or more operative positions. Also, the detent and indent automatic mechanism 23, 24 and 25, is very useful in providing precision elements to the tool setting. As one rotates the tool holder this not only automatically indicates the correct positions of clutch engagement, but the indent being on the periphery of the column in theoretical positions defines the angle of tool presentation relative to the work, and inasmuch as it accurately defines the positions of the tool holder regardless of lost motion, the clamping and locking or clutching mechanism coördinate to fix the tool holder exactly in its various predetermined positions.

Having thus described my invention, I claim as new and desire to secure by Letters Patent of the United States:—

1. A support and rigid column, an adjustable multiple tool holder on the support concentric to the column, a longitudinally confined annulus on the column, a column member operatively connected to said annulus to be translated thereby, and coacting clutch members on the holder and said member, said translated motion also serving to clamp the holder relative to the support and column.

2. A support and rigid column, an adjustable multiple tool holder on the support concentric to the column, a longitudinally confined annulus on the column, a column member operatively connected to said annulus to be translated thereby, coacting clutch members on the holder and said member, said translated motion also serving to clamp the holder relative to the support and column, and means functional automatically when the holder is rotatably adjusted to predeterminately position the tool.

3. A support, a circumferentially centrally bored column thereon, a clamping bolt securing the column on the support, and having a flange head projecting above the column, an adjustable tool holder on the support concentric to the column, a rotatable member vertically confined between the column and bolt head concentric to the bolt, a member splined in the column and having screw-threaded engagement with said splined member, and coacting clutch members on the tool holder and on said splined member.

4. A support and rigid column, an adjustable tool holder, having a clutch surface and a clamping surface on the support, a member to be translated on the column having a coacting clutch surface and movable to clamp the holder relative to the support and column, and an actuator for said member rotatably supported and vertically confined on the column, adapted to coördinately effect said clutching and clamping actions.

5. In a device of the class described, a support and rigid column, an adjustable tool-holder seated on the support and having a direct axial bearing on the column, a non-rotatable member on the column, inter-locking devices between the upper portion of the tool-holder and the lower portion of said member, a rotatable actuator on the column for operating said member and means operated by said actuator for clamping said tool-holder to the support.

6. In a device of the class described, the combination of a support and a rigid, circumferential column, an adjustable multiple tool-holder on the support having a direct circumferential bearing on the column, a rotatable concentric member on the column, a member on the column to be translated by said rotatable member, the adjacent surfaces of said tool-holder and member to be translated being formed with devices for inter-locking the tool-holder against rotation, and a support engaging clamp actuated by said concentric rotatable member.

7. In a device of the class described, a unitary organization for interchangeable use in connection with machine tool supports and comprising a column having self-contained provision for rigidly clamping to a tool-holder, an adjustable multiple tool-holder on the column, a non-rotatable member to be translated on the column, and a rotatable actuator operatively connected thereto for translating said member to clutch and clamp the tool-holder in selective position on the column.

8. A support, a rigid column, a toothed adjustable tool-holder thereon, a coacting vertically movable toothed member on the column, a support engaging clamp on the column, and means on the column for coördinating said tooth-interlock and clamp for securing the tool-holder rigidly in adjusted position.

9. A support, a rigid column, a rotatable tool holder seated on the support concentric to the column and formed with an upwardly projecting clutch surface, a vertically moving member formed with a downwardly projected coacting clutch surface for clutching the tool holder relative to the column, and clamping it against the seat, and a single actuator for operating said vertically movable member.

10. A support, a rigid column, an adjustable toothed multiple tool holder, a vertically movable coacting toothed member for clutching the tool holder and clamping it relative to the support, said member being movable into and out of clutch-engaging position with the tool-holder, the clutch engaging positions being a multiple of the number of tools mountable on the holder, and a single actuator for operating said vertically movable member to clutch and clamp the tool holder.

11. A support and rigid column, a toothed adjustable tool-holder, a coacting toothed member on the column, a support engaging clamp, an actuator on the column for operating said clamp and said toothed member, and automatic detent and indent mechanism indicating positions of tooth intermesh when the tool-holder is rotatably adjusted.

12. A support and rigid column, an adjustable tool-holder, a vertically movable member on the column, said member and tool-holder having a tooth intermesh, and means clamping the tool-holder to the support when the tool-holder is interlocked with said column member.

13. A support and rigid column, an adjustable tool-holder, a vertically movable member on the column, said member and tool-holder having a tooth intermesh, means clamping the tool-holder to the support when the tool-holder is interlocked with said column member, and an automatic tool alining mechanism operative in tool-holder interlocking positions.

14. A support and rigid column, a toothed tool-holder, a coacting toothed member therefor on the column to interlock the tool-holder against rotation, means for clamping the tool-holder to the support in its interlocked position, and a common actuator for operating the said interlock and clamp.

15. A support and rigid column, a rotatable tool-holder thereon, having its upper portion formed with teeth, an annular, nonrotatable member vertically movable on the column and having teeth for engaging the tool-holder teeth, means for vertically moving said member for interlocking the tool-holder against rotation, and means coördinating with said vertically moving member to clamp the tool-holder to the support and column when it is interlocked against rotation.

In witness whereof, I hereunto subscribe my name, as attested by the two subscribing witnesses.

WILLIAM L. SCHELLENBACH.

Witnesses:
  EMMA SPENER,
  L. A. BECK.